MOSHER & CONBOIE.
Brush Machine.
No. 23,385.
Patented March 29, 1859.
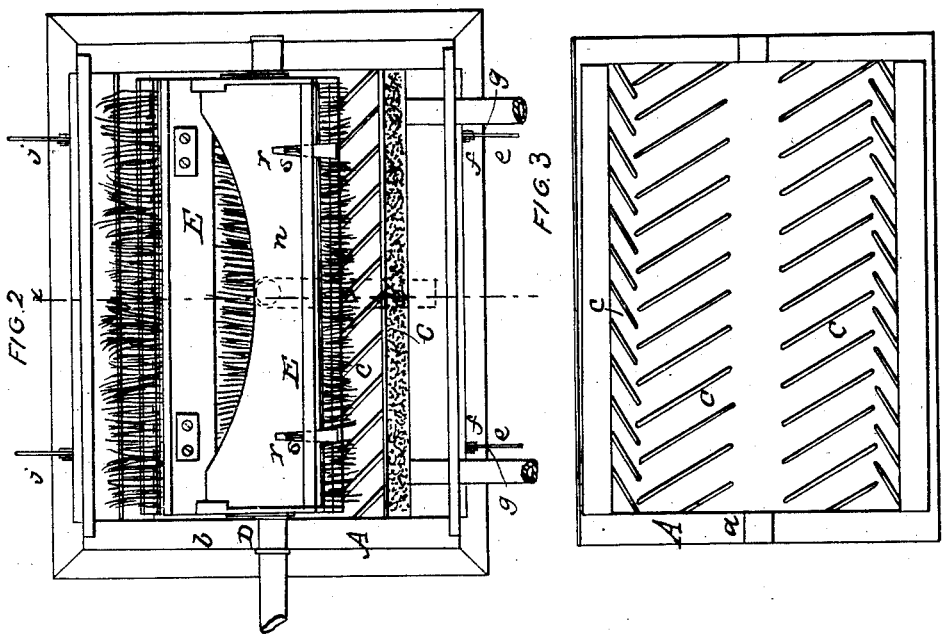
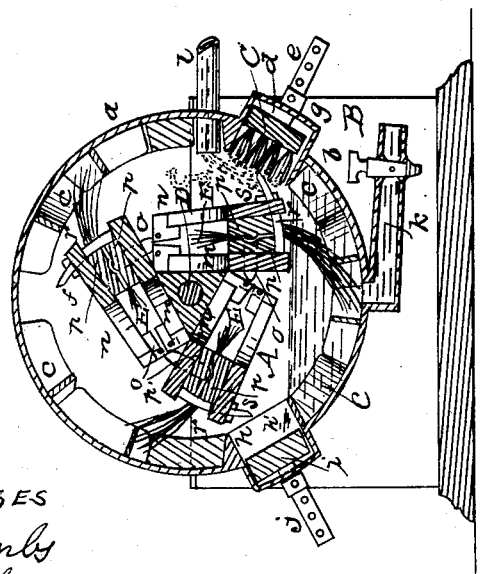
WITNESSES
INVENTORS

UNITED STATES PATENT OFFICE.

H. W. MOSHER AND J. A. CONBOIE, OF NEW YORK, N. Y.

APPARATUS FOR CLEANSING BRISTLES.

Specification of Letters Patent No. 23,385, dated March 29, 1859.

*To all whom it may concern:*

Be it known that we, HENRY W. MOSHER and JOSEPH A. CONBOIE, of the city, county, and State of New York, have invented a new and useful Machine for Washing or Cleaning Bristles for Brushes; and we do hereby declare that the following is a full, clear, and exact description of the same, reference being had to the annexed drawings, making a part of this specification, in which—

Figure 1, is a transverse vertical section of our invention taken in the line $x$, $x$, Fig. 2. Fig. 2, a plan or top view of ditto, with the cover or cap removed. Fig. 3, an inverted plan of the cover or cap.

Similar letters of reference indicate corresponding parts in the several figures.

This invention consists in securing the bristles to be washed in clamps attached to a rotating shaft which is placed in a suitable box or case provided with suds and having diagonal plates attached to its inner surface and also a pressure brush, and soap or other cleansing material, the whole being arranged as hereinafter fully shown and described, whereby the desired work may be performed in a very rapid manner and with a much greater degree of perfection than can be done by the usual manual process.

To enable those skilled in the art to fully understand and construct our invention we will proceed to describe it.

A, represents a box or case which is of cylindrical form the upper part $a$, which is the cover or cap being removable and secured to the lower part $b$, in any proper way. The box or case is secured in any suitable framing B, and both the upper and lower parts of the box or case have diagonal plates $c$, attached to their inner surfaces, said plates being in rows, the plates of one row being in a reverse position to those of the other, as clearly shown in Fig. 3.

At one side of the box or case A, there is a longitudinal recess $d$, in which a brush C, is placed, the back of said brush having rods $e$, attached, which rods pass through the side of the box or case and permit of the adjustment of the brush further in or out as may be desired,—pins or bolts $f$, passing through the rods $e$, and through perforated flanches $g$, attached to the box or case and between which flanches the rods $e$, pass. In the opposite side of the box or case A, there is a recess $h$, which like the recess $d$, extends the whole length of the box or case A. This recess $h$, is designed to contain soap or other chemical cleansing substance $h'$, and it has a bar $i$, fitted within with adjusting rods $j$, attached to its back precisely similar to the rods $e$, of the brush C.

To the bottom of the box or case A, an eduction pipe $k$, is attached and induction pipes $l$, are attached to the upper part of the lower part $b$, of the box or case. Within the box or case a shaft D, is placed and allowed to rotate freely, one end of said shaft projecting through the end of the box or case and having a crank attached. To the shaft D, a series of clamps F, are attached. These clamps are formed of stationary plates $m$, attached permanently to the sides of the shaft, which is of tri-lateral form. To the inner edge of each plate $m$, a similar plate $n$, is connected by joints or hinges $o$, the plates $m$, $n$, having jaws $p$, $p'$, attached to their inner surfaces, the jaws $p$ having concave and the jaws $p'$, convex surfaces, so that the bristles may be firmly grasped by them, as shown clearly in red Fig. 1, the jaws being secured together by curved bars $r$, and keys or wedges $s$, as shown in Fig. 1.

The operation is as follows: The bristles shown in red are secured between the jaws $p$, $p'$. The box or case A, is supplied with a requisite quantity of water or suds and the shaft D, is rotated by hand, the bristles being rubbed or swaged first to the right and then to the left by the diagonal plates $c$, the brush C, being so adjusted as to bear against the bristles and subject them to a certain pressure and friction as they pass over its surface. The soap or other chemical substance $h'$, also acts upon the bristles which by the operation described become thoroughly cleansed, that is to say, the outer or exposed parts. The inner parts grasped and inclosed by the clamps are not cleaned nor is it necessary they should be, as such portions are secured within the head or stock of the brush. The water when necessary may be drawn off through the pipe $k$, and fresh water admitted through pipes $l$.

We do not confine ourselves to any particular number of clamps on the shaft D, nor to any particular arrangement thereof for various modifications of the same may be used.

Having thus described our invention what we claim as new and desire to secure by Letters Patent, is,

The rotating bristle clamps E, placed within a cylindrical box or case A, provided with diagonal plates $c$, and used with or without the brush C, and soap bar or other cleansing substance $h'$, substantially as and for the purpose set forth.

HENRY W. MOSHER.
        JOSEPH A. CONBOIE.

Witnesses:
  J. W. COOMBS,
  M. HUGHES.